US010908753B2

(12) United States Patent
Moseley

(10) Patent No.: US 10,908,753 B2
(45) Date of Patent: Feb. 2, 2021

(54) CAPACITIVELY COUPLED CONDUCTORS

(71) Applicant: Tactual Labs Co., New York, NY (US)

(72) Inventor: Braon Moseley, Round Rock, TX (US)

(73) Assignee: Tactual Labs Co., New York, NY (US)

( * ) Notice: Subject to any disclaimer, the term of this patent is extended or adjusted under 35 U.S.C. 154(b) by 0 days.

(21) Appl. No.: 16/382,881

(22) Filed: Apr. 12, 2019

(65) Prior Publication Data
US 2019/0317642 A1    Oct. 17, 2019

Related U.S. Application Data

(60) Provisional application No. 62/657,103, filed on Apr. 13, 2018.

(51) Int. Cl.
*G06F 3/044*    (2006.01)
*G06F 3/047*    (2006.01)

(52) U.S. Cl.
CPC ............ *G06F 3/0446* (2019.05); *G06F 3/047* (2013.01); *G06F 2203/04101* (2013.01); *G06F 2203/04104* (2013.01)

(58) Field of Classification Search
CPC ...... G06F 3/044; G06F 3/0446; G06F 3/0448; G06F 3/047; G06F 2203/04101; G06F 2203/04111; G06F 2203/04112; H01Q 21/28
See application file for complete search history.

(56) References Cited

U.S. PATENT DOCUMENTS

| 6,219,113 | B1 * | 4/2001 | Takahara | G02F 1/1334 345/98 |
| 9,019,224 | B2 * | 4/2015 | Leigh | G06F 3/044 345/173 |
| 9,158,411 | B2 * | 10/2015 | Leigh | G06F 3/0421 |
| 9,710,113 | B2 * | 7/2017 | Wigdor | G06F 3/0416 |
| 9,804,721 | B2 * | 10/2017 | Leigh | G06F 3/044 |
| 9,811,214 | B2 * | 11/2017 | Forlines | G06F 3/0416 |
| 2004/0178977 | A1 * | 9/2004 | Nakayoshi | G09G 3/3614 345/87 |
| 2006/0267953 | A1 * | 11/2006 | Peterson, Jr. | G06F 3/0418 345/173 |
| 2009/0256817 | A1 * | 10/2009 | Perlin | G06F 3/0233 345/174 |
| 2009/0303203 | A1 * | 12/2009 | Yilmaz | G06F 3/0418 345/174 |
| 2009/0315854 | A1 * | 12/2009 | Matsuo | G06F 3/0412 345/174 |
| 2010/0013745 | A1 * | 1/2010 | Kim | G06F 3/0412 345/76 |
| 2010/0110038 | A1 * | 5/2010 | Mo | G06F 3/044 345/174 |

(Continued)

*Primary Examiner* — Michael J Eurice
(74) *Attorney, Agent, or Firm* — Adam Landa

(57) ABSTRACT

A touch device has a plurality of row conductors and a plurality of column conductors. Located proximate to where the row conductors and the column conductors interact are additional conductor arrangements that are able to increase the capacitive interaction that occurs on the touch device. The conductor arrangements are formed from different column conductors and row conductors located proximate to the where the row and column conductors interact and form different arrangements.

11 Claims, 6 Drawing Sheets

(56) References Cited

U.S. PATENT DOCUMENTS

| | | | |
|---|---|---|---|
| 2010/0182275 A1* | 7/2010 | Saitou | G06F 3/044 345/174 |
| 2011/0069022 A1* | 3/2011 | Yokota | G06F 3/0416 345/173 |
| 2011/0090172 A1* | 4/2011 | Kaya | G06F 3/044 345/174 |
| 2011/0156930 A1* | 6/2011 | Chen | G06F 3/044 341/33 |
| 2011/0157043 A1* | 6/2011 | Lai | G06F 3/0412 345/173 |
| 2011/0157058 A1* | 6/2011 | Bita | G02B 6/0055 345/173 |
| 2011/0298746 A1* | 12/2011 | Hotelling | G06F 3/0418 345/174 |
| 2012/0044203 A1* | 2/2012 | Ishizaki | G06F 3/0412 345/174 |
| 2012/0062250 A1* | 3/2012 | Kuo | G06F 3/044 324/686 |
| 2012/0062511 A1* | 3/2012 | Ishizaki | G06F 3/0412 345/174 |
| 2012/0075201 A1* | 3/2012 | Golovchenko | G06F 3/044 345/173 |
| 2012/0098759 A1* | 4/2012 | Chang | G06F 3/0418 345/173 |
| 2012/0186966 A1* | 7/2012 | Chang | G06F 3/044 200/600 |
| 2012/0306565 A1* | 12/2012 | Hsu | G06F 3/044 327/517 |
| 2013/0050130 A1* | 2/2013 | Brown | G06F 3/044 345/174 |
| 2013/0062182 A1* | 3/2013 | Tokura | H03K 17/962 200/600 |
| 2013/0106725 A1* | 5/2013 | Bakken | G06F 3/033 345/173 |
| 2013/0194232 A1* | 8/2013 | Imamura | G06F 3/044 345/174 |
| 2013/0285945 A1* | 10/2013 | Oh | G06F 3/044 345/173 |
| 2013/0285975 A1* | 10/2013 | Hong | G06F 3/044 345/174 |
| 2014/0062934 A1* | 3/2014 | Coulson | G06F 3/044 345/174 |
| 2014/0063385 A1* | 3/2014 | Yang | G06F 3/0412 349/15 |
| 2014/0139481 A1* | 5/2014 | Han | G06F 3/044 345/174 |
| 2014/0152685 A1* | 6/2014 | Iwaki | G09G 3/2007 345/589 |
| 2014/0152916 A1* | 6/2014 | Nakamura | G06F 3/044 349/12 |
| 2014/0152921 A1* | 6/2014 | Yashiro | G06F 3/044 349/12 |
| 2014/0198268 A1* | 7/2014 | Sugita | G06F 3/044 349/12 |
| 2014/0210784 A1* | 7/2014 | Gourevitch | H03K 17/962 345/174 |
| 2014/0267140 A1* | 9/2014 | Leigh | G06F 3/044 345/174 |
| 2014/0292710 A1* | 10/2014 | Koito | G06F 3/044 345/174 |
| 2014/0293158 A1* | 10/2014 | Kurasawa | G06F 3/044 349/12 |
| 2014/0347299 A1* | 11/2014 | Lu | G06F 3/044 345/173 |
| 2015/0028894 A1* | 1/2015 | Sleeman | G06F 3/044 324/662 |
| 2015/0049056 A1* | 2/2015 | Post | G06F 3/041 345/174 |
| 2015/0062457 A1* | 3/2015 | Kida | G06F 3/044 349/12 |
| 2015/0130750 A1* | 5/2015 | Morrison | G06F 3/0416 345/174 |
| 2015/0261344 A1* | 9/2015 | Wigdor | G06F 3/044 345/174 |
| 2015/0346889 A1* | 12/2015 | Chen | G06F 3/0416 345/174 |
| 2016/0062505 A1* | 3/2016 | Hwang | G06F 3/0412 345/174 |
| 2016/0188085 A1* | 6/2016 | Leigh | G06F 3/0416 345/174 |
| 2016/0202789 A1* | 7/2016 | Kim | G06F 3/044 345/174 |
| 2016/0364071 A1* | 12/2016 | Chiang | G02F 1/13439 |
| 2017/0024051 A1* | 1/2017 | De Araujo | G06F 3/0416 |
| 2017/0024052 A1* | 1/2017 | Jota Costa | G06F 3/016 |
| 2017/0024056 A1* | 1/2017 | Wilkinson | G06F 3/0416 |
| 2017/0024061 A1* | 1/2017 | Forlines | G06F 3/044 |
| 2017/0059912 A1* | 3/2017 | Kim | G02F 1/13338 |
| 2017/0060317 A1* | 3/2017 | Kim | G06F 3/0416 |
| 2017/0090635 A1* | 3/2017 | Kim | G06F 3/0412 |
| 2017/0102817 A1* | 4/2017 | Tsuruma | G06F 3/044 |
| 2017/0139525 A1* | 5/2017 | Jo | H01L 51/529 |
| 2017/0176797 A1* | 6/2017 | Kim | G02F 1/13338 |
| 2017/0177125 A1* | 6/2017 | Kim | G06F 3/0412 |
| 2017/0192564 A1* | 7/2017 | Li | G06F 3/044 |
| 2017/0193265 A1* | 7/2017 | Chan | G06F 3/044 |
| 2017/0262108 A1* | 9/2017 | Lin | G02F 1/133528 |
| 2017/0262135 A1* | 9/2017 | Wigdor | G06F 3/0418 |
| 2017/0329456 A1* | 11/2017 | Leigh | G06F 3/0412 |
| 2017/0371487 A1* | 12/2017 | Morelli | G06F 3/0446 |
| 2018/0004304 A1* | 1/2018 | Moseley | G06F 3/0202 |
| 2018/0024667 A1* | 1/2018 | Moseley | G06F 3/044 345/174 |
| 2018/0059825 A1* | 3/2018 | Moseley | G06F 3/044 |
| 2018/0067366 A1* | 3/2018 | Kimura | G02F 1/133512 |
| 2018/0081489 A1* | 3/2018 | Leigh | G06F 3/0418 |
| 2018/0164921 A1* | 6/2018 | Leigh | G06F 3/017 |
| 2018/0267599 A1* | 9/2018 | Holman | G06F 3/011 |
| 2018/0267653 A1* | 9/2018 | Holman | G06F 3/015 |
| 2018/0299993 A1* | 10/2018 | Leigh | G06F 3/044 |
| 2018/0306568 A1* | 10/2018 | Holman | G06F 3/0416 |
| 2018/0335880 A1* | 11/2018 | Seol | G06F 3/0488 |
| 2018/0348937 A1* | 12/2018 | Pak | G06F 3/0412 |
| 2019/0042032 A1* | 2/2019 | Moseley | H01Q 21/28 |
| 2019/0114028 A1* | 4/2019 | Moseley | G06F 3/0416 |
| 2019/0317642 A1* | 10/2019 | Moseley | G06F 3/0448 |

* cited by examiner

CAPACITIVELY COUPLED CONDUCTORS

This application claims the benefit of U.S. Provisional Application Ser. No. 62/657,103, filed Apr. 13, 2018, the contents of which are hereby incorporated by reference. This application includes material which is subject to copyright protection. The copyright owner has no objection to the facsimile reproduction by anyone of the patent disclosure, as it appears in the Patent and Trademark Office files or records, but otherwise reserves all copyright rights whatsoever.

FIELD

The disclosed systems relate in general to the field of user input, and in particular to devices sensitive to touch, including, hover and pressure.

BRIEF DESCRIPTION OF THE DRAWINGS

The foregoing and other objects, features, and advantages of the disclosure will be apparent from the following more particular description of embodiments as illustrated in the accompanying drawings in which reference characters refer to the same parts throughout the various views. The drawings are not necessarily to scale, emphasis instead being placed upon illustrating principles of the disclosed embodiments.

DETAILED DESCRIPTION

Figure 1:
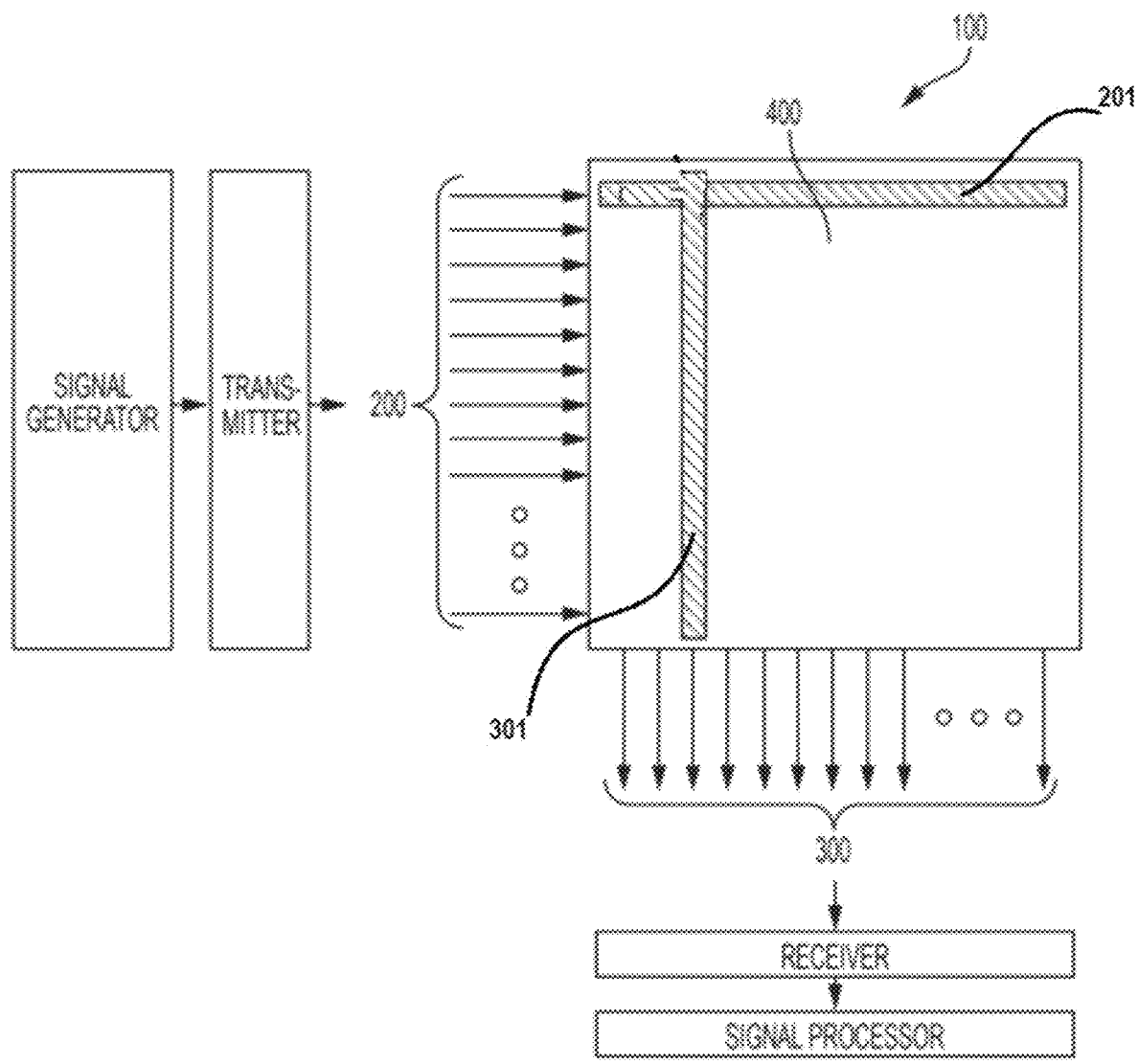
FIG. 1 is a high level block diagram illustrating an embodiment of a sensor device.

This application relates to user interfaces such as found in U.S. patent application Ser. No. 15/195,675, entitled "Frame-Phase Synchronization in Frequency Division Modulated Touch Systems." The entire disclosure of that application, and the applications incorporated therein by reference, are incorporated herein by reference. Familiarity with the concepts and terms therein is presumed. The conductor arrangements are suited for use with frequency orthogonal signaling techniques (see, e.g., U.S. Pat. Nos. 9,019,224, 9,529,476, and 9,811,214, all of which are hereby incorporated herein by reference). The sensor configurations discussed herein may be used with other signal techniques including scanning or time division techniques, and/or code division techniques. The sensors described and illustrated herein are also suitable for use in connection with signal infusion (also referred to as signal injection) techniques and apparatuses.

The presently disclosed systems and methods involve principles related to and for designing, manufacturing and using capacitive based sensors, and particularly capacitive based sensors that employ a multiplexing scheme based on orthogonal signaling such as but not limited to frequency-division multiplexing (FDM), code-division multiplexing (CDM), or a hybrid modulation technique that combines both FDM and CDM methods. References to frequency herein could also refer to other orthogonal signal bases. As such, this application incorporates by reference Applicants' prior U.S. Pat. No. 9,019,224, entitled "Low-Latency Touch Sensitive Device" and U.S. Pat. No. 9,158,411 entitled "Fast Multi-Touch Post Processing." These applications contemplate FDM, CDM, or FDM/CDM hybrid touch sensors which may be used in connection with the presently disclosed sensors. In such sensors, interactions are sensed when a signal from a row is coupled (increased) or decoupled (decreased) to a column and the result received on that column. By sequentially exciting the rows and measuring the coupling of the excitation signal at the columns, a heatmap reflecting capacitance changes, and thus proximity, can be created.

This application also employs principles used in fast multi-touch sensors and other interfaces disclosed in the following: U.S. Pat. Nos. 9,933,880; 9,019,224; 9,811,214; 9,804,721; 9,710,113; and 9,158,411. Familiarity with the disclosure, concepts and nomenclature within these patents is presumed. The entire disclosures of those patents and the applications incorporated therein by reference are incorporated herein by reference. This application also employs principles used in fast multi-touch sensors and other interfaces disclosed in the following: U.S. patent application Ser. Nos. 15/162,240; 15/690,234; 15/195,675; 15/200,642; 15/821,677; 15/904,953; 15/905,465; 15/943,221; 62/540,458, 62/575,005, 62/621,117, 62/619,656 and PCT publication PCT/US2017/050547, familiarity with the disclosures, concepts and nomenclature therein is presumed. The entire disclosure of those applications and the applications incorporated therein by reference are incorporated herein by reference.

In various embodiments, the present disclosure is directed to systems (e.g., objects, panels or keyboards) sensitive to hover, contact and pressure and their applications in real-world, artificial reality, virtual reality and augmented reality settings. It will be understood by one of ordinary skill in the art that the disclosures herein apply generally to all types of systems using fast multi-touch to detect hover, contact and pressure. In an embodiment, the present system and method can be applied to keyboards, including but not limited to membrane keyboards, dome-switch keyboards, scissor-switch keyboards, capacitive keyboards, mechanical-switch keyboards, buckling-spring keyboards, hall-effect keyboards, laser projection keyboard, roll-up keyboards, and optical keyboard technology.

Throughout this disclosure, the terms "touch", "touches", "touch event", "contact", "contacts", "hover", or "hovers" or other descriptors may be used to describe events or periods of time in which a user's finger, a stylus, an object, or a body part is detected by a sensor. In some sensors, detections occur only when the user is in physical contact with a sensor, or a device in which it is embodied. In some embodiments, and as generally denoted by the word "contact", these detections occur as a result of physical contact with a sensor, or a device in which it is embodied. In other embodiments, and as sometimes generally referred to by the term "hover", the sensor may be tuned to allow for the detection of "touches" that are hovering at a distance above the touch surface or otherwise separated from the sensor device and causes a recognizable change, despite the fact that the conductive or capacitive object, e.g., a finger, is not in actual physical contact with the surface. Therefore, the use of language within this description that implies reliance upon sensed physical contact should not be taken to mean that the techniques described apply only to those embodiments; indeed, nearly all, if not all, of what is described herein would apply equally to "contact" and "hover", each of which is a "touch". Generally, as used herein, the word "hover" refers to non-contact touch events or touch, and as used herein the term "hover" is one type of "touch" in the sense that "touch" is intended herein. Thus, as used herein, the phrase "touch event" and the word "touch" when used as a noun include a near touch and a near touch event, or any other gesture that can be identified using a sensor. "Pressure" refers to the force per unit area exerted by a user contact (e.g., presses by their fingers or hand) against the surface of an object. The amount of "pressure" is similarly a measure of "contact", i.e., "touch". "Touch" refers to the states of "hover", "contact", "pressure", or "grip", whereas a lack of "touch" is generally identified by signals being below a threshold for accurate measurement by the sensor. In accordance with an embodiment, touch events may be detected, processed, and supplied to downstream computational processes with very low latency, e.g., on the order of ten milliseconds or less, or on the order of less than one millisecond.

As used herein, and especially within the claims, ordinal terms such as first and second are not intended, in and of themselves, to imply sequence, time or uniqueness, but rather, are used to distinguish one claimed construct from another. In some uses where the context dictates, these terms may imply that the first and second are unique. For example, where an event occurs at a first time, and another event occurs at a second time, there is no intended implication that the first time occurs before the second time, after the second time or simultaneously with the second time. However, where the further limitation that the second time is after the first time is presented in the claim, the context would require reading the first time and the second time to be unique times. Similarly, where the context so dictates or permits, ordinal terms are intended to be broadly construed so that the two identified claim constructs can be of the same characteristic or of different characteristic. Thus, for example, a first and a second frequency, absent further limitation, could be the same frequency, e.g., the first frequency being 10 Mhz and the second frequency being 10 Mhz; or could be different frequencies, e.g., the first frequency being 10 Mhz and the second frequency being 11 Mhz. Context may dictate otherwise, for example, where a first and a second frequency are further limited to being frequency-orthogonal to each other, in which case, they could not be the same frequency.

In an embodiment, a fast multi-touch sensor utilizes a projected capacitive method that has been enhanced for high update rate and low latency measurements of touch events. The technique can use parallel hardware and higher frequency waveforms to gain the above advantages. Also disclosed are methods to make sensitive and robust measurements, which methods may be used on transparent display surfaces and which may permit economical manufacturing of products which employ the technique. In this regard, a "capacitive object" as used herein could be a finger, other part of the human body, a stylus, or any object to which the sensor is sensitive. The sensors and methods disclosed herein need not rely on capacitance. With respect to, e.g., an optical sensor, such embodiments utilize photon tunneling and leaking to sense a touch event, and a "capacitive object" as used herein includes any object, such as a stylus or finger, that that is compatible with such sensing. Similarly, "touch locations" and "touch sensitive device" as used herein do not require actual touching contact between a capacitive object and the disclosed sensor.

In an embodiment, a signal generator and transmitter are operatively connected to each of the rows and configured to generate and transmit each of a plurality of frequency-orthogonal signals to each of the rows. In an embodiment, a receiver and signal processor are associated with each receive column and operatively connected thereto.

In an embodiment, a mixed signal integrated circuit comprises signal generator, transmitter, receiver and signal processor. In an embodiment, the mixed signal integrated circuit is adapted to generate one or more signals and send the signals to transmit antennas. In an embodiment, the mixed signal integrated circuit is adapted to generate a plurality of frequency-orthogonal signals and send the plurality of frequency-orthogonal signals to the transmit antenna. In an embodiment, the mixed signal integrated circuit is adapted to generate a plurality of frequency-orthogonal signals and send one or more of the plurality of frequency-orthogonal signals to each of a plurality of rows. In an embodiment, the frequency-orthogonal signals are in the range from DC up to about 2.5 GHz. In an embodiment, the frequency-orthogonal signals are in the range from DC up to about 1.6 MHz. In an embodiment, the frequency-orthogonal signals are in the range from 50 KHz to 200 KHz. The frequency spacing between the frequency-orthogonal signals should be greater than or equal to the reciprocal of an integration period (i.e., the sampling period).

In an embodiment, the signal processor of a mixed signal integrated circuit (or a downstream component or software) is adapted to determine at least one value representing each frequency orthogonal signal transmitted to a row. In an embodiment, the signal processor of the mixed signal integrated circuit (or a downstream component or software) performs a Fourier transform to received signals. In an embodiment, the mixed signal integrated circuit is adapted to digitize received signals. In an embodiment, the mixed signal integrated circuit (or a downstream component or software) is adapted to digitize received signals and perform a discrete Fourier transform (DFT) on the digitized information. In an embodiment, the mixed signal integrated circuit (or a downstream component or software) is adapted to digitize received signals and perform a Fast Fourier transform (FFT) on the digitized information—an FFT being one type of discrete Fourier transform.

It will be apparent to a person of skill in the art in view of this disclosure that a DFT, in essence, treats the sequence of digital samples (e.g., window) taken during a sampling period (e.g., integration period) as though it repeats. As a consequence, signals that are not center frequencies (i.e., not integer multiples of the reciprocal of the integration period (which reciprocal defines the minimum frequency spacing)), may have relatively nominal, but unintended consequence of contributing small values into other DFT bins. Thus, it will also be apparent to a person of skill in the art in view of this disclosure that the term orthogonal as used herein is not "violated" by such small contributions. In other words, as we use the term frequency orthogonal herein, two signals are considered frequency orthogonal if substantially all of the contribution of one signal to the DFT bins is made to different DFT bins than substantially all of the contribution of the other signal.

In an embodiment, received signals are sampled at at least 1 MHz. In an embodiment, received signals are sampled at at least 2 MHz. In an embodiment, received signals are sampled at 4 Mhz. In an embodiment, received signals are sampled at 4.096 Mhz. In an embodiment, received signals are sampled at more than 4 MHz.

To achieve kHz sampling, for example, 4096 samples may be taken at 4.096 MHz. In such an embodiment, the integration period is 1 millisecond, which per the constraint that the frequency spacing should be greater than or equal to the reciprocal of the integration period provides a minimum frequency spacing of 1 KHz. (It will be apparent to one of skill in the art in view of this disclosure that taking 4096 samples at e.g., 4 MHz would yield an integration period slightly longer than a millisecond, and not not achieving kHz sampling, and a minimum frequency spacing of 976.5625 Hz.) In an embodiment, the frequency spacing is equal to the reciprocal of the integration period. In such an embodiment, the maximum frequency of a frequency-orthogonal signal range should be less than 2 MHz. In such an embodiment, the practical maximum frequency of a frequency-orthogonal signal range should be less than about 40% of the sampling rate, or about 1.6 MHz. In an embodiment, a DFT (which could be an FFT) is used to transform the digitized received signals into bins of information, each reflecting the frequency of a frequency-orthogonal signal transmitted which may have been transmitted by the transmit antenna 130. In an embodiment 2048 bins correspond to frequencies from 1 KHz to about 2 MHz. It will be apparent to a person of skill in the art in view of this disclosure that these examples are simply that, exemplary. Depending on the needs of a system, and subject to the constraints described above, the sample rate may be increased or decrease, the integration period may be adjusted, the frequency range may be adjusted, etc.

In an embodiment, a DFT (which could be an FFT) output comprises a bin for each frequency-orthogonal signal that is transmitted. In an embodiment, each DFT (which could be an FFT) bin comprises an in-phase (I) and quadrature (Q) component. In an embodiment, the sum of the squares of the I and Q components is used as measure corresponding to signal strength for that bin. In an embodiment, the square root of the sum of the squares of the I and Q components is used as measure corresponding to signal strength for that bin. It will be apparent to a person of skill in the art in view of this disclosure that a measure corresponding to the signal strength for a bin could be used as a measure related to touch. In other words, the measure corresponding to signal strength in a given bin would change as a result of a touch event.

FIG. 1 illustrates certain principles of a fast multi-touch sensor 100 in accordance with an embodiment. At 200, a different signal is transmitted into each of the row conductors 201 of the touch surface 400. The signals are designed to be "orthogonal", i.e., separable and distinguishable from each other. At 300, a receiver is attached to each column conductor 301. The row conductors 201 and the column conductors 301 are conductors/antennas that are able to transmit and/or receive signals. The receiver is designed to receive any of the transmitted signals, or an arbitrary combination of them, with or without other signals and/or noise, and to individually determine a measure, e.g., a quantity for each of the orthogonal transmitted signals present on that column conductor 301. The touch surface 400 of the sensor comprises a series of row conductors 201 and column conductors 301 (not all shown), along which the orthogonal signals can propagate. In an embodiment, the row conductors 201 and column conductors 301 are designed so that, when they are not subject to a touch event, a lower or negligible amount of signal is coupled between them, whereas, when they are subject to a touch event, a higher or non-negligible amount of signal is coupled between them. In an embodiment, the opposite could hold—having the lesser amount of signal represent a touch event, and the greater amount of signal represent a lack of touch. Because the touch sensor ultimately detects touch due to a change in the coupling, it is not of specific importance, except for reasons that may otherwise be apparent to a particular embodiment, whether the touch-related coupling causes an increase in amount of row signal present on the column or a decrease in the amount of row signal present on the column. As discussed above, the touch, or touch event does not require a physical touching, but rather an event that affects the level of coupled signal.

With continued reference to FIG. 1, generally, the capacitive result of a touch event in the proximity of both a row conductor 201 and column conductor 301 may cause a non-negligible change in the amount of signal present on the row to be coupled to the column. More generally, touch events cause, and thus correspond to, the received signals on the column conductors 301. Because the signals on the row conductors 201 are orthogonal, multiple row signals can be coupled to a column conductor 301 and distinguished by the receiver. Likewise, the signals on each row conductor 201 can be coupled to multiple column conductors 301. For each column conductor 301 coupled to a given row conductor 201 (and regardless of whether the coupling causes an increase or decrease in the row signal to be present on the column), the signals found on the column conductor 301 contain information that will indicate which row conductors 201 are being touched simultaneously with that column conductor 301. The quantity of each signal received is generally related to the amount of coupling between the column conductor 301 and the row conductor 201 carrying the corresponding signal, and thus, may indicate a distance of the touching object to the surface, an area of the surface covered by the touch and/or the pressure of the touch.

When a row conductor 201 and column conductor 301 are touched simultaneously, some of the signal that is present on the row conductor 201 is coupled into the corresponding column conductor 301 (the coupling may cause an increase or decrease of the row signal on the column conductor 301). (As discussed above, the term touch or touched does not require actual physical contact, but rather, relative proximity.) Indeed, in various implementations of a touch device, physical contact with the row conductors 201 and/or column conductors 301 is unlikely as there may be a protective barrier between the row conductors 201 and/or column conductors 301 and the finger or other object of touch. Moreover, generally, the row conductors 201 and column conductors 301 themselves are not in touch with each other, but rather, placed in a proximity that allows an amount of signal to be coupled there-between, and that amount changes (positively or negatively) with touch. Generally, the row-column coupling results not from actual contact between them, nor by actual contact from the finger or other object of touch, but rather, by the capacitive effect of bringing the finger (or other object) into close proximity—which close proximity resulting in capacitive effect is referred to herein as touch.

The nature of the row conductors 201 and column conductors 301 is arbitrary and the particular orientation is irrelevant. Indeed, the terms row conductor 201 and column conductor 301 are not intended to refer to a square grid, but rather to a set of conductors upon which signal is transmitted (rows) and a set of conductors onto which signal may be coupled (columns). (The notion that signals are transmitted on row conductors 201 and received on column conductors 301 itself is arbitrary, and signals could as easily be transmitted on conductors arbitrarily designated columns and received on conductors arbitrarily named rows, or both could arbitrarily be named something else. Further, it is not necessary that the row conductors 201 and column conductors 301 be in a grid. Other shapes are possible as long as a touch event will touch part of a "row" and part of a "column", and cause some form of coupling. For example, the "rows" could be in concentric circles and the "columns" could be spokes radiating out from the center. And neither the "rows" nor the "columns" need to follow any geometric or spatial pattern, thus, for example, the keys on keyboard could be arbitrarily connected to form rows and columns (related or unrelated to their relative positions.) Moreover, it is not necessary for there to be only two types signal propagation channels: instead of rows and columns, in an embodiment, channels "A", "B" and "C" may be provided, where signals transmitted on "A" could be received on "B" and "C", or, in an embodiment, signals transmitted on "A" and "B" could be received on "C". It is also possible that the signal propagation channels can alternate function, sometimes supporting transmitters and sometimes supporting receivers. It is also contemplated that the signal propagation channels can simultaneously support transmitters and receivers—provided that the signals transmitted are orthogonal, and thus separable, from the signals received. Three or more types of antenna conductors may be used rather than just "rows" and "columns." Many alternative embodiments are possible and will be apparent to a person of skill in the art after considering this disclosure.

As noted above, in an embodiment the touch surface 400 comprises a series of row conductors 201 and column conductors 301, along which signals can propagate. As discussed above, the row conductors 201 and column conductors 301 are designed so that, when they are not being touched, one amount of signal is coupled between them, and when they are being touched, another amount of signal is coupled between them. The change in signal coupled between them may be generally proportional or inversely proportional (although not necessarily linearly proportional) to the touch such that touch is less of a yes-no question, and more of a gradation, permitting distinction between more touch (i.e., closer or firmer) and less touch (i.e., farther or softer)—and even no touch. Moreover, a different signal is transmitted into each of the rows. In an embodiment, each of these different signals are orthogonal (i.e., separable and distinguishable) from one another. When a row and column are touched simultaneously, signal that is present on the row is coupled (positively or negatively), causing more or less to appear in the corresponding column. The quantity of the signal that is coupled onto a column may be related to the proximity, pressure or area of touch.

At 300, a receiver is attached to each column conductor 301. The receiver is designed to receive the signals present on the column conductors 301, including any of the orthogonal signals, or an arbitrary combination of the orthogonal signals, and any noise or other signals present. Generally, the receiver is designed to receive a frame of signals present on the column conductor 301, and to identify the columns providing signal. In an embodiment, the receiver (or a signal processor associated with the receiver data) may determine a measure associated with the quantity of each of the orthogonal transmitted signals present on that column conductor 301 during the time the frame of signals was captured. In this manner, in addition to identifying the row conductors 201 in touch with each column conductor 301, the receiver can provide additional (e.g., qualitative) information concerning the touch. In general, touch events may correspond (or inversely correspond) to the received signals on the column conductors 301. For each column conductor 301, the different signals received thereon indicate which of the corresponding row conductors 201 is being touched simultaneously with that column conductor 301. In an embodiment, the amount of coupling between the corresponding row conductor 201 and column conductor 301 may indicate e.g., the area of the surface covered by the touch, the pressure of the touch, etc. In an embodiment, a change in coupling over time between the corresponding row conductor 201 and column conductor 301 indicates a change in touch at the intersection of the two.

The row conductor 201 and column conductor 301 setup shown in FIG. 1 provides the framework for the discussion related to the capacitively coupled conductor arrangements discussed below. In FIGS. 2-6, implementations of row conductors 201 and column conductors 301 are shown that use various geometries of capacitively coupled conductors in order to enhance the interactions that occur with touch events.

Turning to FIGS. 2-6, row conductors 201 and column conductors 301 having the same characteristics and properties as the rows and columns discussed above are shown implemented in embodiments using capacitively coupled row conductors and column conductors. In general, when discussing the embodiments shown in FIGS. 2-6 reference will be made to signals being transmitted down row conductor 201, however it should be understood that signals may also be transmitted down columns 301 in some embodiments with capacitively coupled signals being received on the respective row conductor 201 and other conductor arrangements. The descriptions below referring only to row conductors having signal transmitted thereon is for ease of description and should not be construed to limit the scope of the invention.

Figure 2:
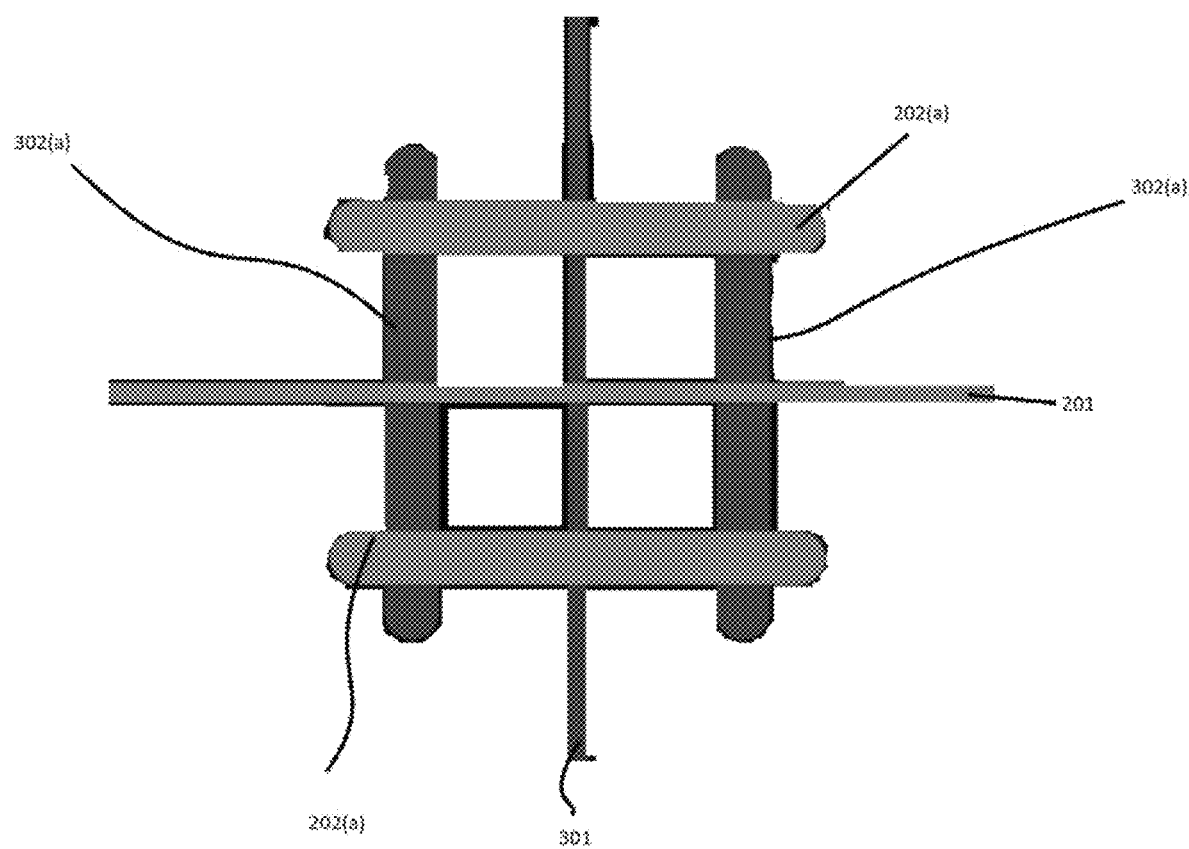
FIG. 2 shows an embodiment of a conductor arrangement.

Turning to FIG. 2, located proximate to the row conductors 201 and the column conductors 301 are row conductors 202(a) and column conductors 302(a). The row conductors 202(a) and the column conductors 302(a) are located proximate to where the row 201 and the column 301 are coupled. In FIG. 2, the row conductors 202(a) and the column conductors 302(a) are situated as isolated structures that are proximate to but not in physical contact with row 201 and the column 301.

In FIG. 2, row conductors 202(a) are located as being parallel to each other and the row conductor 201. In FIG. 2, one row conductor 202(a) is located on one side of the row conductor 201 and the other row conductor 202(a) is located on the other side of the row conductor 201. The row conductors 202(a) are located in the same plane as the row 201. In an embodiment the row conductors 202(a) are situated so that the row conductors 202(a) are in the same plane but the row conductor 201 is in a different plane. In an embodiment each of the row conductors 202(a) and the row conductor 201 are located in different planes from each other.

The row conductors 202(a) are not in physical contact with the row 201 or each other. Additionally, the row conductors 202(a) are not in physical contact with the column conductor 301 or the column conductors 302(a). While the row conductors 202(a) are not in physical contact with the row conductor 201, column conductor 301 or column conductors 302(a) signals that are transmitted down the row conductor 201 or the column conductor 301 can also be found on the row conductors 202(a). That is to say the row conductors 202(a) are situated close enough to the row conductor 201 so that signal present on row conductor 201 is also present to on row conductors 202(a). The signal that is present on the row conductors 202(a) can be coupled with the column conductor 301 and the column conductors 302(a). The conductor arrangement that is present in FIG. 2 increases the area that is able to be capacitively coupled to the column conductors 301 and the column conductors 302(a).

Still referring to FIG. 2, one column conductor 302(a) is located on one side of the column conductor 301 and the other column conductor 302(a) is located on the other side of the column conductor 301. The column conductors 302(a) are located in the same plane as the column 301. In an embodiment the column conductors 302(a) are situated so that the column conductors 302(a) are in the same plane but the column conductor 301 is in a different plane. In an embodiment each of the column conductors 302(a) and the column conductor 301 are located in different planes from each other.

The column conductors 302(a) are not in physical contact with the column 301 or each other. Additionally, the column conductors 302(a) are not in physical contact with the row conductor 201 or the row conductors 201(a). While the column conductors 302(a) are not in physical contact with the row conductor 201, column conductor 301 or row conductors 202(a), signals that are transmitted down the row conductor 201 can also be located on the column conductors 302(a) during a touch event. During a touch event signal that is present on the row conductors 201(a) and the row conductor 201 may be coupled to the column conductor 301 and column conductors 302(a). In an embodiment, the signals may be transmitted down the column conductor 301 and the column conductors 302(a) are located proximate to the column conductor 301 so that signal is additional present on the column conductors 302(a).

The signals coupled to the column conductors 301 and the column conductors 302(a) are received by a receiver and processed in order to determine a magnitude and location of a touch event. Furthermore, where the row conductors 202(a) and the column conductors 301(a) overlap (i.e. where their paths cross but do not physically contact each other), additional interaction can be observed due to touch events. Signal that is present on the row conductors 202(a) can be capacitively coupled to the column conductors 302(a) which in turn is ultimately received by the receivers and processed.

The geometry shown in FIG. 2 increases the area in which potential touch events can be detected and processed. The geometry shown in FIG. 2 is that of a square shaped conductor arrangement that is separate from but proximate to the row conductor and column conductor crossing. The row conductors 202(a) and column conductors 302(a) increase the areas of potential coupling and enhance the interactions. In an embodiment, the geometry of the conductor arrangement is that of a rectangle. In an embodiment, the geometry of the conductor arrangement is that of a diamond in a top down view of the conductors.

Figure 3:
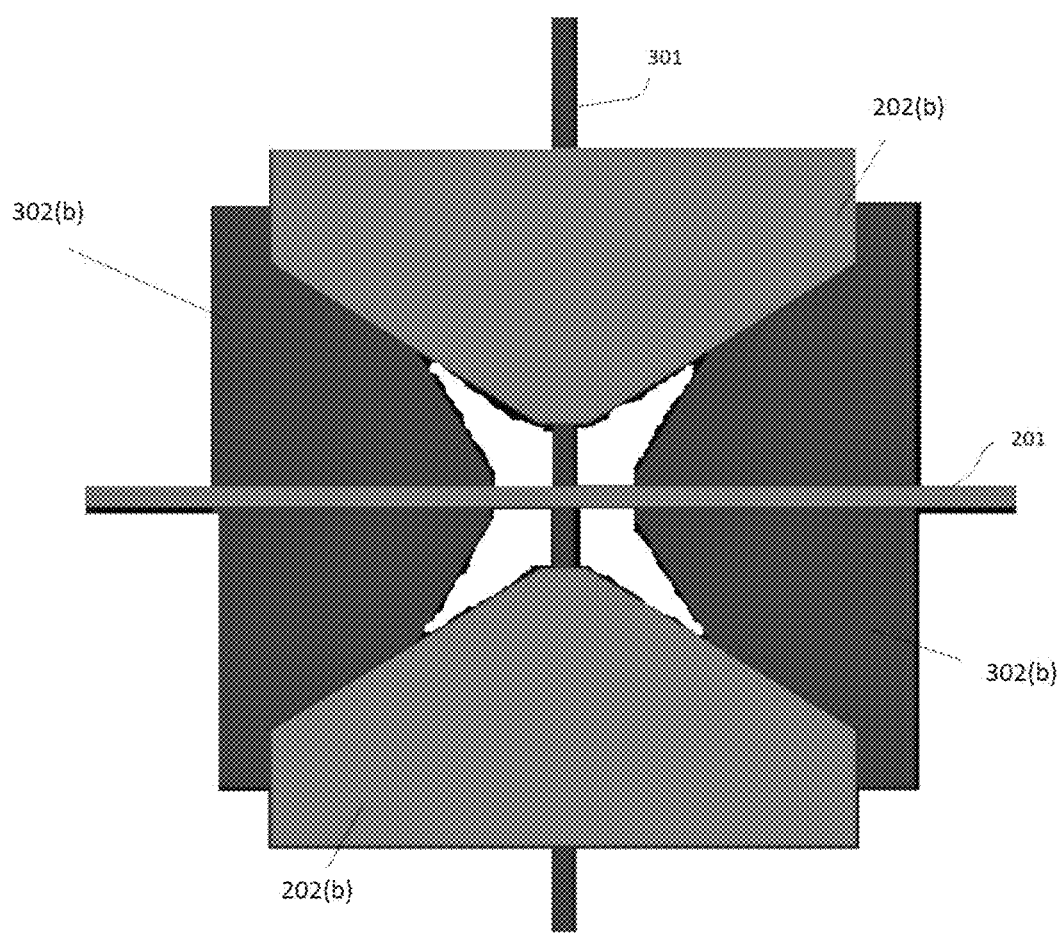
FIG. 3 shows another embodiment a conductor arrangement.

FIG. 3 shows another embodiment of a conductor arrangement. The rows 201 and columns 301 have the same characteristics and properties as the row conductors and column conductors discussed above. Located proximate to the locations where row conductors 201 and the column conductors 301 couple are row conductors 202(b) and column conductors 302(b).

In FIG. 3, the row conductors 202(b) and the column conductors 302(b) are situated as isolated structures that are proximate to but not in physical contact with row conductor 201 and the column conductor 301. Row conductors 202(b) have a combined shape that is both rectangular and triangle. The row conductors 202(b) have substantially the same geometry as home plate in a baseball game. This shape is an irregular pentagon, having two regular sides parallel to each other and perpendicular to its base that are coincident with an isosceles triangle. This shape can be referred to as an isosceles right pentagon. The rectangular shape transitions into a triangular shape as it extends towards the area where the row conductor 201 and column conductor 301 are coupled to each other.

In FIG. 3, one row conductor 202(b) is located on one side of the row conductor 201 and the other row conductor 202(b) is located on the other side of the row conductor 201. The row conductors 202(b) are located in the same plane as the row conductors 201. In an embodiment the row conductors 202(b) are situated so that the row conductors 202(b) are in the same plane but the row conductor 201 is in a different plane. In an embodiment each of the row conductors 202(b) and the row conductor 201 are located in different planes from each other.

The row conductors 202(b) are not in physical contact with row conductor 201 or each other. Additionally, the row conductors 202(b) are not in physical contact with the column conductor 301 or the column conductors 302(b). While the row conductors 202(b) are not in physical contact with the row conductor 201, column conductor 301 or column conductors 301(b) signals that are transmitted down the row conductor 201 is also present on the row conductors 202(b) due to the proximity of the row conductors 202(b) to the row conductor 201. The row conductor 202(b) can be coupled with the column 301 and the column conductor 302(b) during a touch event. Capacitively coupled signal from the row conductors 202(b) can be received at a receiver and processed. The processed signal can be used to determine the magnitude and location of a touch event.

Still referring to FIG. 3, column conductor 302(b) is located on one side of the column 301 and the other column conductor 302(b) is located on the other side of the column 301. Column conductor 302(b) has a rectangular shape that transitions into a triangular shape as it extends towards the area where the row conductor 201 and column conductor 301 cross each other and are able to be coupled during a capacitive event. The column conductors 302(b) are located in the same plane as the column 301. In an embodiment the column conductors 302(b) are situated so that the column conductors 302(b) are in the same plane but the column conductor 301 is in a different plane. In an embodiment each of the column conductors 302(b) and the column conductor 301 are located in different planes from each other.

The column conductors 302(b) are not in physical contact with the column conductor 301 or each other. Additionally, the column conductors 302(b) are not in physical contact with the row conductor 201 or the row conductors 201(b). While the column conductors 302(a) are not in physical contact with the row conductor 201, column conductor 301 or row conductors 202(b) signals that are transmitted down the row conductor 201 can be coupled to the column conductors 302(b). The column conductor 302(b) can be coupled with the row conductor 201, the column conductor 301 and the row conductor 202(b).

When a signal is transmitted down the row conductor 201, some of the transmitted signal can be found coupled to the row conductors 202(b) and column conductors 302(b) and additionally detected during a touch event. The signals can be coupled to and detected on the column conductor 301 and the column conductors 302(b). Furthermore, where the row conductors 202(b) and the column conductors 301(b) paths cross but do not physically contact each other, additional interaction can be observed due to touch events.

The geometry shown in FIG. 3 increases the area in which potential touch events can be detected and discriminated. The row conductors 202(b) and column conductors 302(b)

increase the area of coupling and enhance the interactions. In an embodiment the geometries of the row conductors 202(b) and the column conductors 302(b) are varied in length and width. In an embodiment, the geometries of the conductors take the form of a different polygonal shape. In an embodiment, the conductor is pentagonal shaped. In an embodiment, the conductor is hexagonal shaped. In an embodiment, the conductor is heptagonal shaped. In an embodiment, the conductor is triangular shaped. In an embodiment, the conductor is octagonal shaped.

Figure 4:
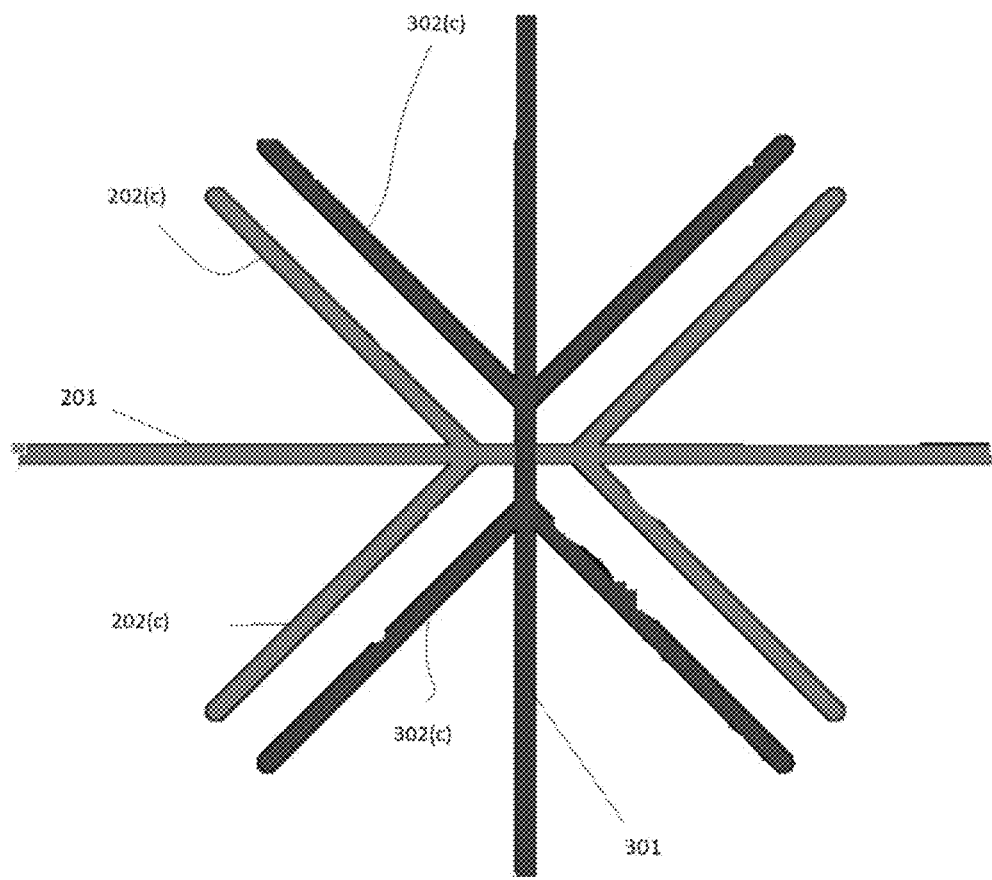
FIG. 4 shows another embodiment a conductor arrangement.

FIG. 4 shows the row conductors 202(c) and the column conductors 302(c) situated as projections that extend from row conductor 201 and the column conductor 301 close to the area where the row conductor 201 and column conductor 301 are coupled. The row conductors 202(c) and the column conductors 302(c) form branches of the row conductor 201 and the column conductor 301.

The row conductors 202(c) extend at 45 degree angles from the row conductors 201. In an embodiment, the row conductors 202(c) extend at a 35 degree angle from the row conductor 201. In an embodiment, the row conductors 202(c) extend at a 55 degree angle from the row conductor 201. In an embodiment, the row conductors 202(c) extend at a 65 degree angle from the row conductor 201. In an embodiment, the row conductors 202(c) extend at a 75 degree angle from the row conductor 201.

The row conductors 202(c) extend in a lengthwise direction away from the area where the row conductor 201 and the column conductor 301 couple with each other. One set of row conductors 202(c) extends one way in a lengthwise direction while another set extends in a lengthwise direction opposite to the direction the first set of row conductors extend. The row conductors 202(c) are physically connected to the row conductor 201 and branch from the row conductor 201. In an embodiment, each row conductor 202(c) is perpendicular to one other row conductor 202(c) when forming the branches. In an embodiment, the row conductors 202(c) are also parallel to the column conductor 302(c). The row conductors 202(c) are located in the same plane as the row conductor 201. In an embodiment the row conductors 202(c) are situated so that the row conductors 202(c) are in the same plane but the row conductor 201 is in a different plane. In an embodiment each of the row conductors 202(c) and the row conductor 201 are located in different planes from each other.

The row conductors 202(c) transmit signals in the same manner that the signals are transmitted on row conductor 201. Signals that are transmitted down the row conductor 201 are also located on the row conductors 202(c). Signals that are transmitted on the row conductors 202(c) are coupled to column conductor 301 and the column conductors 302(c) during touch events. Coupled signals are received by a receiver and processed in order to determine the magnitude and location of a touch event.

Still referring to FIG. 4, one set of column conductors 302(c) is located on one side of the column conductor 301 and another set of column conductors 302(c) is located on the other side of the column conductor 301. One set of column conductors 302(c) is located in the same plane as the column 301 and the other set of column conductors 302(c). In an embodiment the column conductors 302(c) are situated so that the column conductors 302(c) are in the same plane but the column conductor 301 is in a different plane. In an embodiment each of the column conductors 302(c) and the column conductor 301 are located in different planes from each other.

The column conductors 302(c) extend at 45 degree angles from the column conductor 301. In an embodiment, the column conductors 302(c) extend at a 35 degree angle from the column conductor 301. In an embodiment, the column conductors 302(c) extend at a 55 degree angle from the column conductor 301. In an embodiment, the column conductors 302(c) extend at a 65 degree angle from the column conductor 301. In an embodiment, the column conductors 302(c) extend at a 75 degree angle from the column conductor 301.

The geometry of the column conductors 302(c) and the row conductors 202(c) are similar. Signals that are transmitted down the row conductor 201 can be coupled to the column conductors 302(c) during a touch event.

When a signal is transmitted down the row conductor 201, some of the transmitted signal can be coupled to the column conductors 302(c) during a touch event. Furthermore, where the row conductors 202(c) and the column conductors 302(c) extend proximate to each other, additional interaction can be observed due to touch events and the coupling of transmitted signals due to touch events.

The geometry shown in FIG. 4 increases the area in which potential touch events can be detected and processed. The row conductors 202(c) and column conductors 302(c) increase the area of coupling and enhance the interactions that can be determined.

Figure 5:
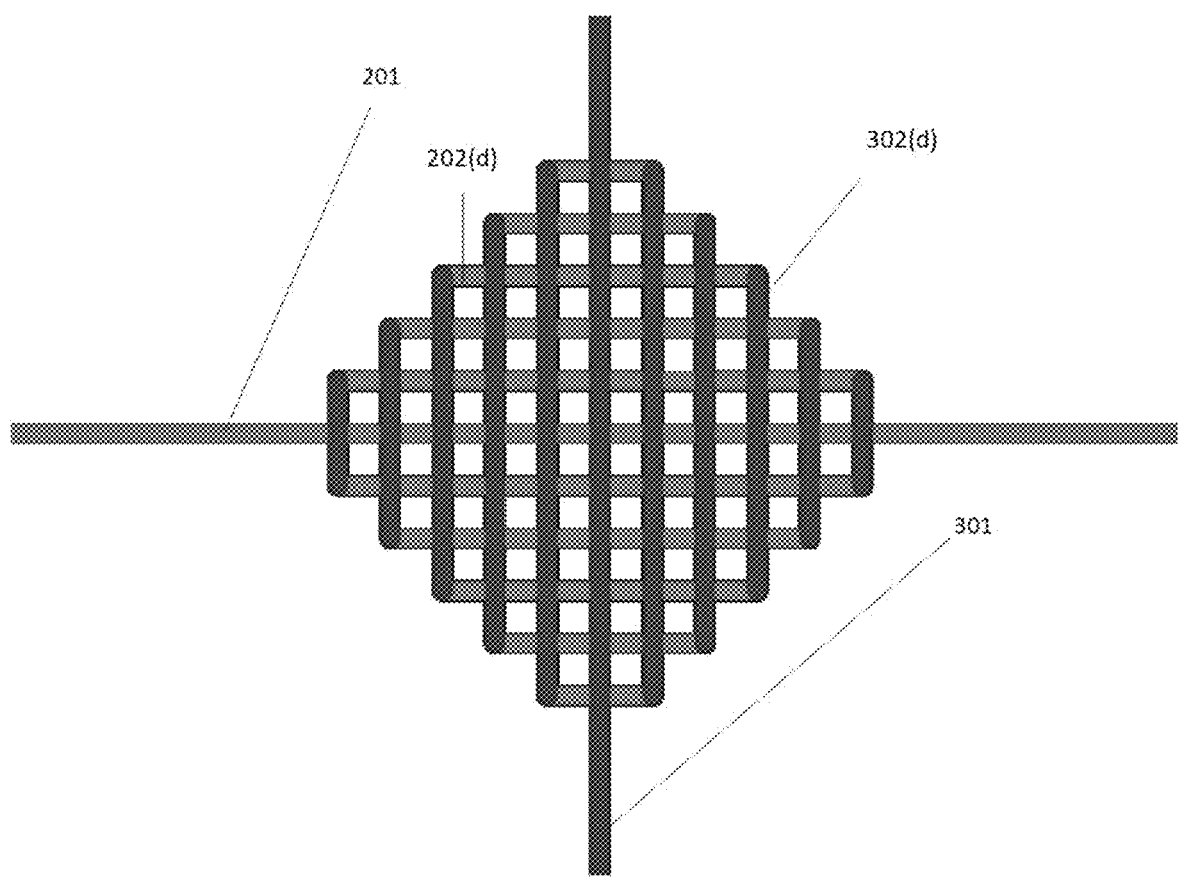
FIG. 5 shows another embodiment a conductor arrangement.

FIG. 5 shows a plurality of row conductors 202(d) and a plurality of column conductors 302(d) situated as isolated structures that are proximate to but not in contact with row conductor 201 and the column conductor 301. Row conductors 202(d) are rectangular and extend parallel to each other and to the row conductor 201. The plurality of row conductors 202(d) have different sizes in the lengthwise direction. The lengths of the row conductors 202(d) decrease as the distance from the row conductor 201 increases. In an embodiment, the lengths of row conductors 202(d) are each the same. In an embodiment, the lengths of the row conductors 202(d) vary as the distance from the row conductor 201 increases. In an embodiment, the lengths of the row conductors 202(d) alternate from being larger in size to smaller in size and back to larger in size as the distance from the row conductor 201 increases. In an embodiment, the spacing between each of the row conductors 202(d) can vary as their location with respect to the row conductor 201 changes.

In FIG. 5, one set of row conductors 202(d) are located on one side of the row conductor 201 and the other set of row conductors 202(d) are located on the other side of the row conductor 201. In FIG. 5, there is an equal number of row conductors 202(d) on each side of the row conductor 201. In an embodiment, there is an unequal number of row conductors 202(d) on each side of the row conductor 201. The row conductors 202(d) are located in the same plane as the row conductor 201. In an embodiment the row conductors 202(d) are situated so that the row conductors 202(d) are in the same plane but the row conductor 201 is in a different plane. In an embodiment each of the row conductors 202(d) and the row conductor 201 are located in different planes from each other.

The row conductors 202(d) are not in physical contact with row conductor 201 or each other. Additionally, the row conductors 202(d) are not in physical contact with column conductor 301 or the column conductors 302(d). While the row conductors 202(d) are not in physical contact with the row conductor 201, column conductor 301 or column conductors 302(d) signals that are transmitted down the row conductor 201 can also be located on the row conductors 202(*d*) during the transmission of the signal. Signal present on the row conductor 202(*d*) can be capacitively coupled with the column conductor 301 and the column conductor 302(*d*).

Column conductors 302(*d*) are located on one side of the column conductor 301 and the other column conductor 302(*d*) are located on the other side of the column conductors 301. The column conductors 302(*d*) are located in the same plane as the column conductor 301. In an embodiment the column conductors 302(*d*) are situated so that the column conductors 302(*d*) are in the same plane but the column conductor 301 is in a different plane. In an embodiment each of the column conductors 302(*d*) and the column conductor 301 are located in different planes from each other. The potential geometries with respect to length and placement of the column conductors 302(*d*) are similar to the row conductors 202(*d*) discussed above.

The column conductors 302(*d*) are not in contact with the column conductor 301 or each other. Additionally, the column conductors 302(*d*) are not in contact with the row conductor 201 or the row conductors 201(*d*). While the column conductors 302(*d*) are not in physical contact with the row conductor 201, column conductor 301 or row conductors 202(*d*), signals that are transmitted down the row conductor 201 can also be capacitively couple to the column conductors 302(*d*) during a touch event. Column conductor 302(*d*) can be capacitively coupled with the row 201, the column conductor 301 and the row conductor 202(*d*) during a touch event.

When a signal is transmitted down the row conductor 201, some of the transmitted signal can be found coupled to the row conductors 202(*d*) and column conductors 302(*d*). Additionally, the signals can be detected and received on the column 301 and the column conductors 302(*d*). Furthermore, where the row conductors 202(*d*) and the column conductors 302(*d*) are proximate to and coupled to each other during a touch event, additional interaction can be observed.

The geometry shown in FIG. 5 increases the area in which potential touch events can be detected and subsequently processed. The row conductors 202(*d*) and column conductors 302(*d*) increase the area of coupling and enhance the interactions that occur during touch events.

Figure 6:
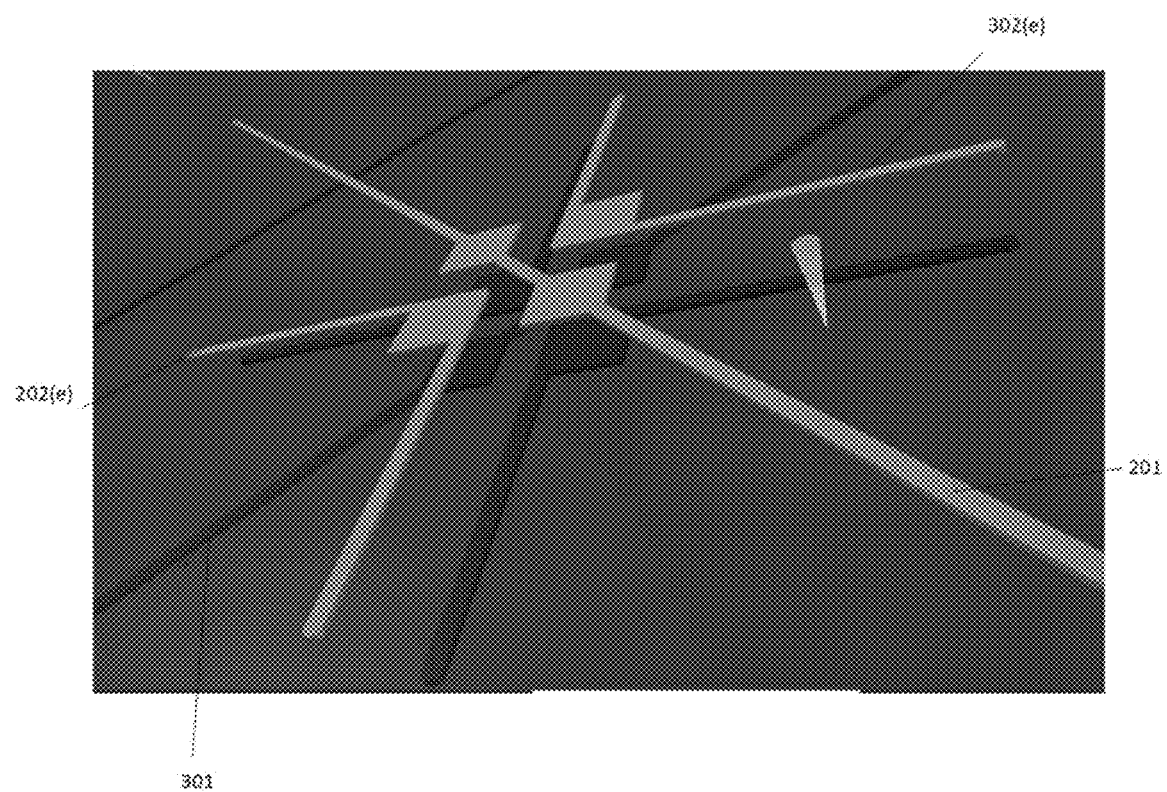
FIG. 6 shows another embodiment a conductor arrangement.

In FIG. 6 the row conductors 202(*e*) and the column conductors 302(*e*) are situated as isolated structures that are proximate to but not in contact with row conductor 201 and the column conductor 301. Row conductors 202(*e*) and row conductor 201 are located in the same plane. In an embodiment the row conductors 202(*e*) are situated so that the row conductors 202(*e*) are in the same plane but the row conductor 201 is in a different plane. In an embodiment each of the row conductors 202(*e*) and the row conductor 201 are located in different planes from each other. Column conductor 302(*e*) and column conductor 301 are located in the same plane. In an embodiment the column conductors 302(*e*) are situated so that the column conductors 302(*e*) are in the same plane but the column conductor 301 is in a different plane. In an embodiment each of the column conductors 302(*e*) and the column conductor 301 are located in different planes from each other.

Row conductors 202(*e*) have an arrowhead shaped geometry. The row conductor 202(*e*) has a square portion with two extensions in a lengthwise direction. The two extensions extend at a right angles with respect to each other with the square portion located where the extensions meet. In an embodiment, the extensions of row conductors 202(*e*) and column conductors 302(*e*) extend parallel to each other.

The row conductor 201 and column conductor 301 shown in FIG. 6 have square islands formed as part of their geometry. The square shaped islands are located proximate to each other and are located at the area where the row conductor 201 and column conductor 301 are proximate to each other. The square shaped island of row conductor 202(*e*) is located over the square island of the column conductor 301.

In FIG. 6, one row conductor 202(*e*) is located on one side of the row conductor 201 and the other row conductor 202(*e*) is located on the other side of the row conductor 201. The row conductors 202(*e*) are not in contact with row conductor 201 or each other. Additionally, the row conductors 202(*e*) are not in contact with the column conductor 301 or the column conductors 302(*e*). While the row conductors 202(*e*) are not in physical contact with the row conductor 201, column conductor 301 or column conductors 301(*e*), signals that are transmitted down the row conductor 201 or can also be located on the row conductors 202(*e*). Row conductors 202(*e*) can be capacitively coupled with the row conductor 201, the column conductor 301 and the column conductor 302(*e*) during touch events.

Still referring to FIG. 6, a column conductor 302(*e*) is located on one side of the column conductor 301 and another column conductor 302(*e*) is located on the other side of the column conductor 301. The column conductors 302(*e*) have a similar geometry as the row conductors 202(*e*). The column conductors 202(*e*) are not in physical contact with column conductor 301 or each other. Additionally, the column conductors 302(*e*) are not in physical contact with the row conductor 201 or the row conductors 202(*e*). While the column conductors 302(*e*) are not in physical contact with the row conductor 201, column conductor 301 or row conductors 202(*e*), signals that are transmitted down the row conductor 201 can be capacitively coupled to the column conductors 302(*e*). Column conductor 302(*e*) can be coupled with the row conductor 201, the column conductor 301 and the row conductors 202(*e*) during a touch event.

When a signal is transmitted down the row conductor 201, some of the transmitted signal can be found coupled to the row conductors 202(*e*) and column conductors 302(*e*) during touch events. Additionally, the signals can be detected and received on the column conductor 301 and the column conductors 302(*e*) and subsequently processed in order to determine a touch event. Furthermore, where the row conductors 202(*e*) and the column conductors 301(*e*) are proximate to each other, additional interaction can be observed due to touch events.

The geometry shown in FIG. 6 increases the area in which potential touch events can be detected and processed. The row conductors 202(*e*) and column conductors 302(*e*) increase the area of coupling and enhance the interactions determined by touch events.

While row conductors and column conductors are discussed above with specific reference to the FIGS. 2-6, other embodiments employing row conductors and column conductors are possible. In an embodiment, the row conductors and column conductors are oriented at 45 degree angles with respect to each other. In an embodiment the column conductors and the row conductors are oriented at different angles. In an embodiment, the row conductors and column conductors are oriented non-parallel to their respective row or column. In an embodiment, the row conductors and column conductors are oriented so that they extend in a direction orthogonal to the page. In an embodiment, the row conductors and column conductors are formed as concentric circles. In an embodiment, the row conductors and column conductors are formed as overlapping circles in different planes. In an embodiment, each of the row conductors and column conductors have different geometries.

An aspect of the disclosure is an apparatus. The apparatus comprises at least one row conductor adapted to transmit a signal generated by a signal generator; at least one column conductor positioned in proximity to the at least one row conductor and operably connected to a receiver such that a touch event proximate to the at least one row conductor and the at least one column conductor causes a change in coupling between the at least one row conductor and the at least one column conductor; a second row conductor not connected to the signal generator, wherein the second row conductor is located proximate to the at least one row conductor and the at least one column conductor such that a touch event proximate to the second row conductor causes a change in coupling, wherein the change in coupling is processed to determine touch events; and a second column conductor not connected to the receiver, wherein the second column conductor is located proximate to the at least one row conductor and the at least one column conductor such that a touch event proximate to the second column conductor causes a change in coupling, wherein the change in coupling is processed to determine touch events.

Another aspect of disclosure is a touch sensitive device. The touch sensitive device comprises at least one row conductor adapted to transmit a signal generated by a signal generator; at least one column conductor positioned in proximity to the at least one row conductor and operably connected to a receiver such that a touch event proximate to the at least one row conductor and the at least one column conductor causes a change in coupling between the at least one row conductor and the at least one column conductor; a second row conductor angled at a non-zero angle with respect to the at least one row conductor, wherein the second row conductor is located proximate to the at least one row conductor and the at least one column conductor such that a touch event proximate to the second row conductor causes a change in coupling, wherein the change in coupling is processed to determine touch events; and a second column conductor angled at a non-zero angle with respect to the at least one column conductor, wherein the second column conductor is located proximate to the at least one row conductor and the at least one column conductor such that a touch event proximate to the second column conductor causes a change in coupling, wherein the change in coupling is processed to determine touch events.

The several embodiments discussed above illustrate a variety of systems for detecting touch events, but are not intended to limit the scope of the claims. Other systems and using row and column conductors to improve touch data will become apparent to persons of skill in the art in view of this disclosure, and are thus included within the scope of this disclosure.

While the invention has been particularly shown and described with reference to a preferred embodiment thereof, it will be understood by those skilled in the art that various changes in form and details may be made therein without departing from the spirit and scope of the invention.

The invention claimed is:

1. An apparatus comprising:
   at least one row conductor adapted to transmit a signal generated by a signal generator;
   at least one column conductor positioned in proximity to the at least one row conductor and operably connected to a receiver such that a touch event proximate to the at least one row conductor and the at least one column conductor causes a change in coupling between the at least one row conductor and the at least one column conductor;
   a second row conductor not connected to the signal generator, wherein the second row conductor is located proximate to the at least one row conductor and the at least one column conductor such that a touch event proximate to the second row conductor causes a change in coupling, wherein the change in coupling is processed to determine touch events;
   a second column conductor not connected to the receiver, wherein the second column conductor is located proximate to the at least one row conductor and the at least one column conductor such that a touch event proximate to the second column conductor causes a change in coupling, wherein the change in coupling is processed to determine touch events;
   a third row conductor not connected to the signal generator, wherein the third row conductor is located proximate to the at least one row conductor and the at least one column conductor such that a touch event proximate to the third row conductor causes a change in coupling, wherein the change in coupling is processed to determine touch events;
   a third column conductor not connected to the receiver, wherein the second column conductor is located proximate to the at least one row conductor and the at least one column conductor such that a touch event proximate to the second column conductor causes a change in coupling, wherein the change in coupling is processed to determine touch events;
   wherein the second row conductor is substantially parallel to the at least one row conductor and the third row conductor; and
   wherein the third column conductor is substantially parallel to the at least one column conductor and the third column conductor.

2. The apparatus of claim 1, wherein the second row conductor is substantially perpendicular to the second column conductor and the third column conductor.

3. The apparatus of claim 1, wherein the second row conductor has an irregular pentagon shape.

4. The apparatus of claim 1, wherein the second row conductor further comprises a square shaped island.

5. The apparatus of claim 1, wherein the third row conductor has a different size than the second row conductor.

6. The apparatus of claim 5, further comprising a fourth row conductor not connected to the signal generator, wherein the fourth row conductor is located proximate to the at least one row conductor and the at least one column conductor such that a touch event proximate to the fourth row conductor causes a change in coupling, wherein the change in coupling is processed to determine touch events, wherein the fourth row conductor has a different size than the second row conductor and the third row conductor.

7. A touch sensitive device comprising:
   at least one row conductor adapted to transmit a signal generated by a signal generator;
   at least one column conductor positioned in proximity to the at least one row conductor and operably connected to a receiver such that a touch event proximate to the at least one row conductor and the at least one column conductor causes a change in coupling between the at least one row conductor and the at least one column conductor;
   a second row conductor angled at a non-zero angle with respect to the at least one row conductor, wherein the second row conductor is located proximate to the at least one row conductor and the at least one column conductor such that a touch event proximate to the second row conductor causes a change in coupling, wherein the change in coupling is processed to determine touch events;

a second column conductor angled at a non-zero angle with respect to the at least one column conductor, wherein the second column conductor is located proximate to the at least one row conductor and the at least one column conductor such that a touch event proximate to the second column conductor causes a change in coupling, wherein the change in coupling is processed to determine touch events;

wherein the second row conductor is angled at a 45 degree angle with respect to at least one row conductor, wherein the second row conductor extends from the at least one row conductor; and a third row conductor, wherein the third row conductor extends from at least one row conductor, wherein the third row conductor forms a right angle with respect to the second row conductor.

8. The touch sensitive device of claim 7, wherein the second column conductor is angled at a 45 degree angle with respect to the at least one column conductor.

9. The touch sensitive device of claim 7, wherein the second row conductor extends from the at least one row conductor.

10. The touch sensitive device of claim 7, wherein the second column conductor extends from the at least one column conductor and is parallel to the second row conductor.

11. The touch sensitive device of claim 7, wherein the second row conductor further comprises a square shaped island.

* * * * *